United States Patent [19]

Liu

[11] Patent Number: 5,402,907
[45] Date of Patent: Apr. 4, 1995

[54] INSTANTLY ASSEMBLED AND MIXED BEVERAGE VESSEL

[76] Inventor: Te-San Liu, c/o Hung Hsing Patent Service Center P.O. Box 55-1670, Taipei, Taiwan, Prov. of China

[21] Appl. No.: 246,767

[22] Filed: May 20, 1994

[51] Int. Cl.⁶ .................................... B65D 23/04
[52] U.S. Cl. .................... 220/502; 220/504; 220/527; 220/4.27; 220/23.83
[58] Field of Search .............. 426/115, 112, 120; 206/222, 219; 220/501, 502, 504, 505, 527, 575, 556, 4.27, 4.31, 4.28, 23.6, 23.83, 23.86

[56] References Cited

U.S. PATENT DOCUMENTS

| | | | |
|---|---|---|---|
| 445,057 | 1/1891 | Harroun | 220/23.86 |
| 2,076,132 | 4/1937 | LeRose | 426/115 |
| 2,631,521 | 3/1953 | Atkins, Jr. | 426/115 |
| 2,813,649 | 11/1957 | Lipari | 220/502 |
| 3,521,745 | 7/1970 | Schwartzman | 220/502 |
| 3,720,523 | 3/1973 | Nakagami | 426/115 |
| 3,920,120 | 11/1975 | Shreda | 206/217 |
| 4,333,581 | 6/1982 | Flansburg | 426/120 |
| 5,085,330 | 2/1992 | Paulin | 220/4.27 |

FOREIGN PATENT DOCUMENTS 142641  8/1935  Austria .......................... 220/23.83

Primary Examiner—Stephen J. Castellano

[57] ABSTRACT

A beverage vessel includes: a hollow stem member having a lower chamber formed in the stem member for filling a first product such as a beverage additive or concentrate therein and a lower conical plug portion formed on a top end of the stem member, and a bowl member having an upper chamber for filling a second product such as water therein and an upper conical socket sealing a bottom of the bowl member, whereby upon an assembly of the bowl member on the stem member to form a stemware by engaging the lower plug portion of the stem member with the upper socket of the bowl member, both the upper socket and the lower plug portion will be broken to mix the first product and the second product with each other for serving an instantly mixed beverage..

6 Claims, 6 Drawing Sheets

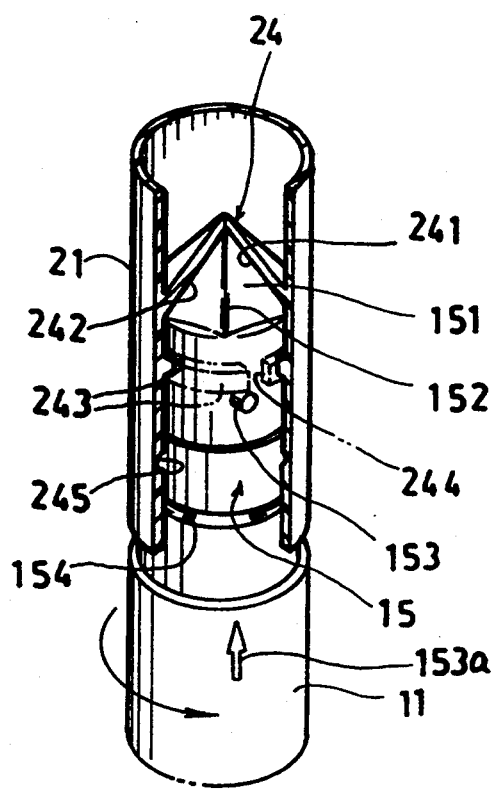
F I G. 3
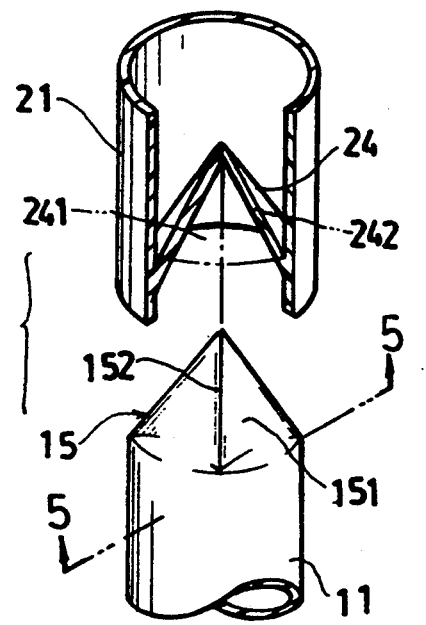
F I G. 4
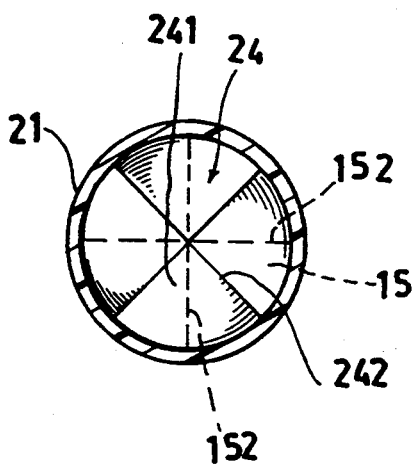
F I G. 5
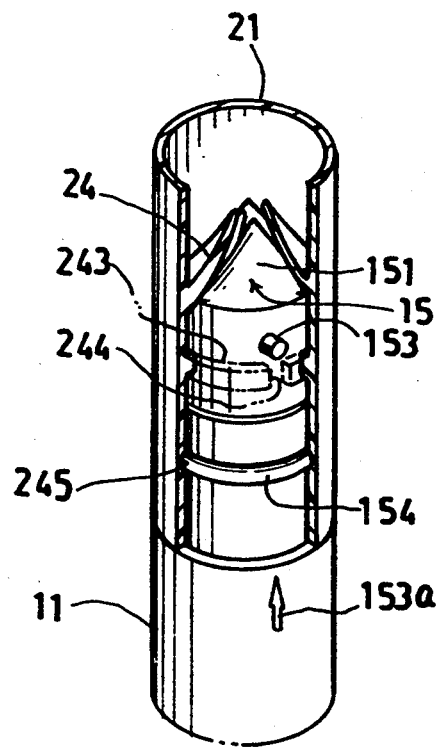
F I G. 6

INSTANTLY ASSEMBLED AND MIXED BEVERAGE VESSEL

BACKGROUND OF THE INVENTION

U.S. Pat. No. 3,920,120 to Andrew P. Shveda discloses a combination package for a primary product and a secondary product complementary to the primary product. The combination package is of the type having a tubular sidewall member and a bottom closure member attached to the sidewall member. The bottom closure member is spaced apart from the lowermost portion of the sidewall member to define a secondary product containment volume. A secondary product is placed in this volume and held in place with a restraining means such as a glue spot or a film of material over the end of the sidewall member. The secondary product may be placed in position at the time of manufacture of the package.

However, whenever blending the primary product with the secondary product, a bottom or sealing disk should be first removed from the bottom chamber (24) and a package for storing the secondary product (18) should be broken to fill the secondary product (18) into the upper chamber (22) to be mixed with the primary product kept in the upper chamber (22), causing inconvenience for a user.

SUMMARY OF THE INVENTION

The object of the present invention is to provide a beverage vessel including: a hollow stem member having a lower chamber formed in the stem member for filling a first product such as a beverage additive or concentrate therein and a lower conical plug portion formed on a top end of the stem member, and a bowl member having an upper chamber for filling a second product such as water therein and an upper conical socket sealing a bottom of the bowl member whereby upon an assembly of the blow member on the stem member to form a stemware by engaging the lower plug portion of the stem member with the upper socket of the blow member, both the upper socket and the lower plug portion will be broken to mix the first product and the second product with each other for serving an instantly mixed beverage.

BRIEF DESCRIPTION OF THE DRAWINGS

FIG. 3 is a partially exploded view showing an engagement of an upper socket with a lower plug portion of the present invention.

FIG. 4 is a perspective illustration showing the engagement of the upper socket with the lower plug portion.

FIG. 5 is a bottom view of the present invention when taken from 5—5 direction of FIG. 4.

FIG. 6 is an illustration showing a mutual engagement and breakage of the upper socket with the lower plug portion of the present invention.

DETAILED DESCRIPTION

Figure 1:
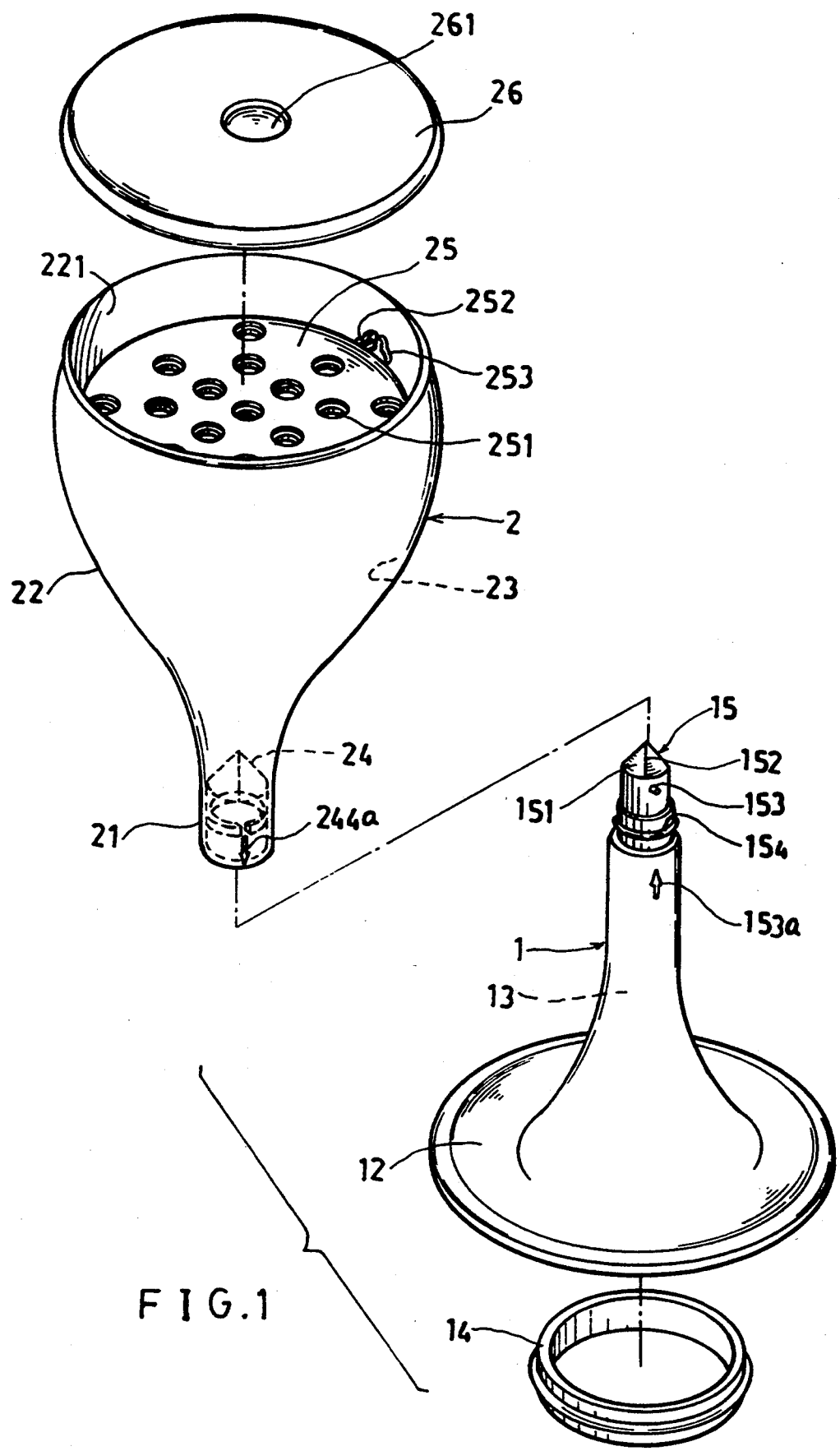
FIG. 1 is an exploded view showing the parts of the present invention.

As shown in FIGS. 1-7, the present invention comprises: a stem member 1 filled with a first product 3 therein, and a bowl member 2 filled with a second product 4 therein.

The first product 3 may be a beverage additive, a concentrate, a solute or any other additive materials to be mixed with the second product 4 for drinking purposes.

The second product 4 may be a solvent, a liquid or solution such as water, liquors or any other aqueous solutions or liquids, soluble with the first product 3. The first and second products 3, 4 are not limited in this invention.

Figures 2, 2A:
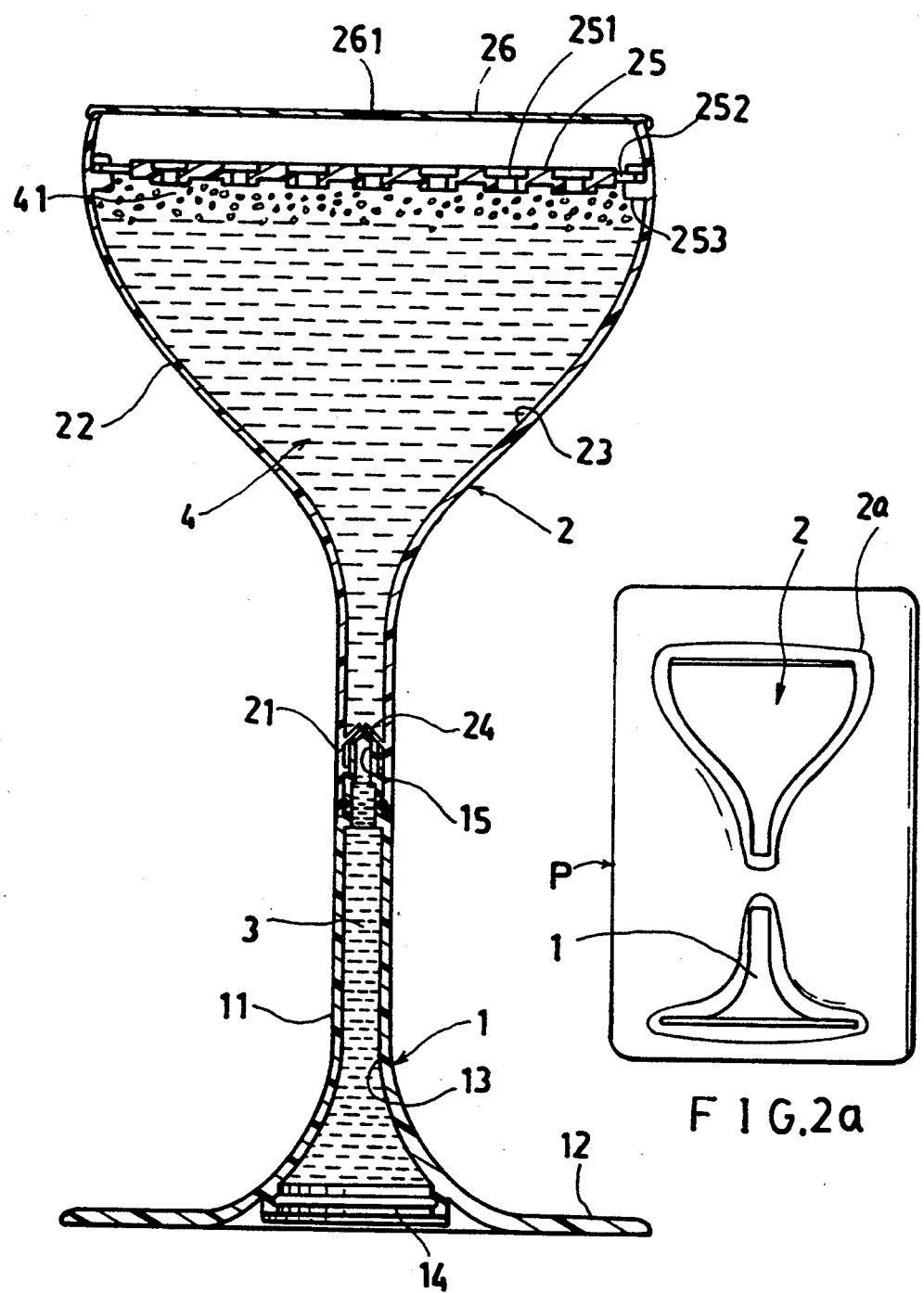
FIG. 2 is a sectional drawing of the present invention when assembled.
FIG. 2a is an illustration showing two parts of the present invention when packed in a package.

For storage, display and handling convenience, the bowl member 2 with its top cover 26 may be further sealed by a film such as a thermoforming plastic film 2a as shown in FIG. 2a and both the blow member 2 and the stem member 1 may be packed in a packaging container P for its safe storage and handling.

The stem member 1 includes: a hollow stem portion 11 protruding and tapered upwardly from a foot portion 12 which may be formed as a circular disk to be placed on a table surface, a lower chamber 13 defined in the hollow stem portion 11 for filling the first product 3 therein, a bottom cover 14 detachably secured to a bottom of the stem member 1 for sealing a bottom portion of the lower chamber 13, and a lower engaging member 15 formed on a top end portion of the stem member 1 sealing a top end portion of the lower chamber 13.

The bowl member 2 includes: a neck portion 21 tapered downwardly from a bowl portion 22 which defines an upper chamber 23 for filling a second product 4 therein, and an upper engaging member 24 formed in a lower portion in the neck portion 21 for sealing a bottom of the upper chamber 23 and engageable with the lower engaging member 14 of the stem member 1 for assembling the bowl member on the stem member 1 for serving a stemware, with the upper engaging member 24 operatively breaking the lower engaging member 15 and being broken by the lower engaging member 15 when engaging the upper and the lower engaging members 24, 15 with each other to allow a mutual dispersion of the second product 4 and the first product 3 with each other for mixing the second product 4 with the first product 3 for serving a mixed beverage in accordance with the present invention.

The lower engaging member 15 includes: a conical plug portion 151 tapered upwardly from a top end of the stem portion 11 and having a thin thickness on the conical plug portion 151, a plurality of lower rigid ridge ribs 152 radially formed on the conical plug portion 151, a protrusion 153 formed on a circumference of a first upper portion of the stem portion 12, and an annular ring 154 annularly formed on a second upper portion of the stem portion 12; and the upper engaging member 24 includes: a conical socket 241 conically recessed upwardly from a lower end portion inside the neck portion 21 of the bowl member 2 and engageable with the conical plug portion 151 and having a thin thickness on the conical socket 241 to be operatively ruptured when engaged with the lower ridge ribs 152 on the lower engaging member 15, a plurality of upper rigid ridge ribs 242 radially formed in the conical socket 2241 for operatively breaking the conical plug portion 141 of the lower engaging member 15 when engaging the upper and the lower engaging members 24, 15, an annular extension 243 annularly formed on a first lower end portion in the neck portion 21 of the bowl member 2 and having a notch 244 notched in the annular extension 243 for engaging the protrusion 153 on the stem portion 11 of the stem member 1 for mutually matching, positioning and engaging the upper and lower engaging members 24, 15 for biting the upper ridge ribs 242 with the conical plug portion 141 and for biting the lower ridge ribs 152 with the conical socket 241 in order for rupturing the plug portion 151 and the conical socket 241 simultaneously for mixing the first and the second products 3, 4 in the stem member 1 and the bowl member 2, and a ring groove 245 annularly recessed in a second lower portion in the neck portion 21 for engaging the annular ring 154 for stably engaging the blow member 2 on the stem member 1.

Figure 7:
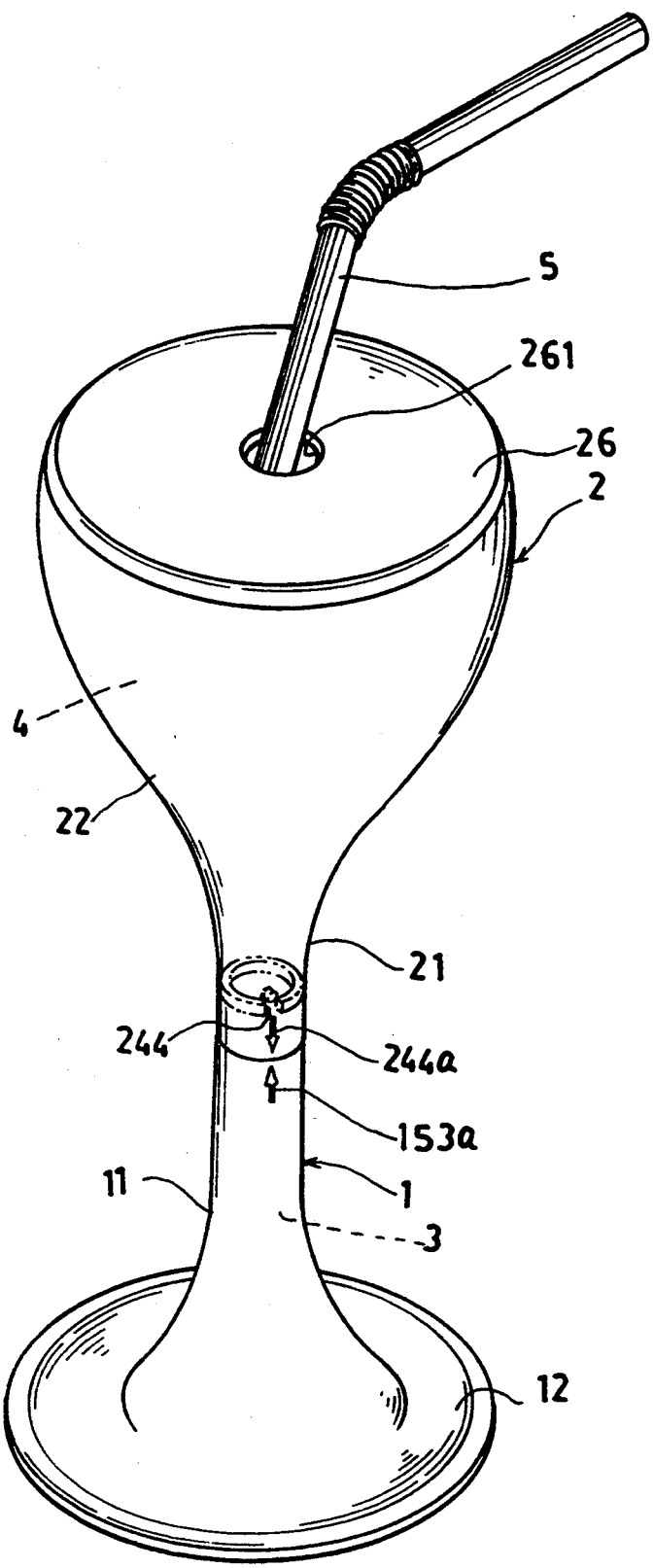
FIG. 7 is an illustration showing an assembled stemware in accordance with the present invention.
Figure 8:
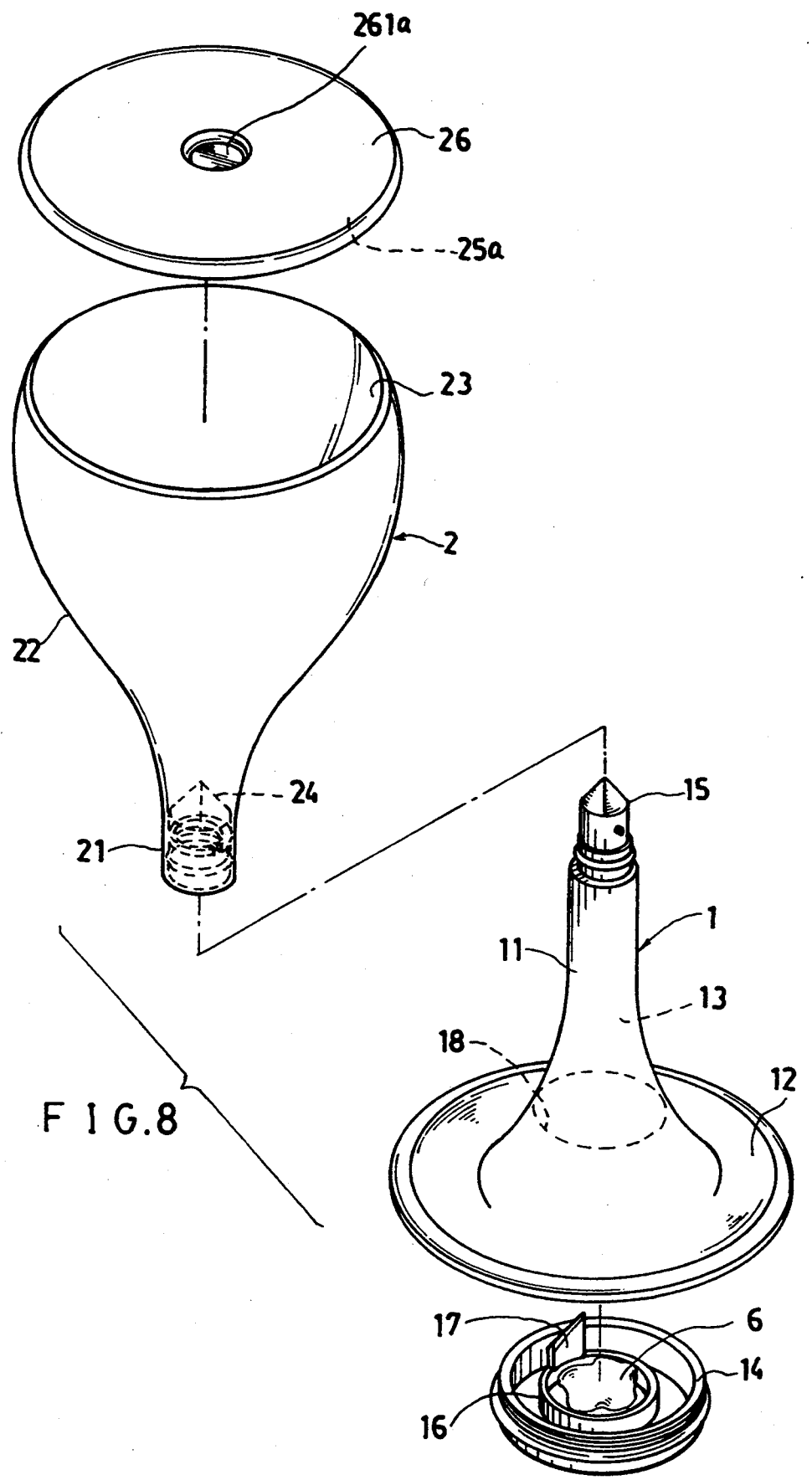
FIG. 8 is an exploded view of another preferred embodiment of the present invention.

As shown in FIG. 7, both protrusion 153 and notch 244 are respectively provided with marks 153a, 244a on the lower stem portion 11 and the upper neck portion 21 for aiming and matching of the protrusion 153 with the notch 244, in order for a sharp matching and biting of the ridge ribs 152, 242 with their corresponding "rupture surface" on the conical socket 241 and the plug portion 151 having thinner thickness for easily breaking the plug portion 151 and the conical socket 241 by the rigid ribs 152, 242. Other engaging and breaking configurations or structures of the two engaging members 15, 24 may be modified in accordance with the present invention, not limited in this invention.

The male plug portion of the lower stem member 1 may also be replaced with the female conical socket of the upper bowl member 1, and vice versa, in accordance with the present invention.

The present invention may be modified without departing from the spirit and scope of this invention.

Figure 9:
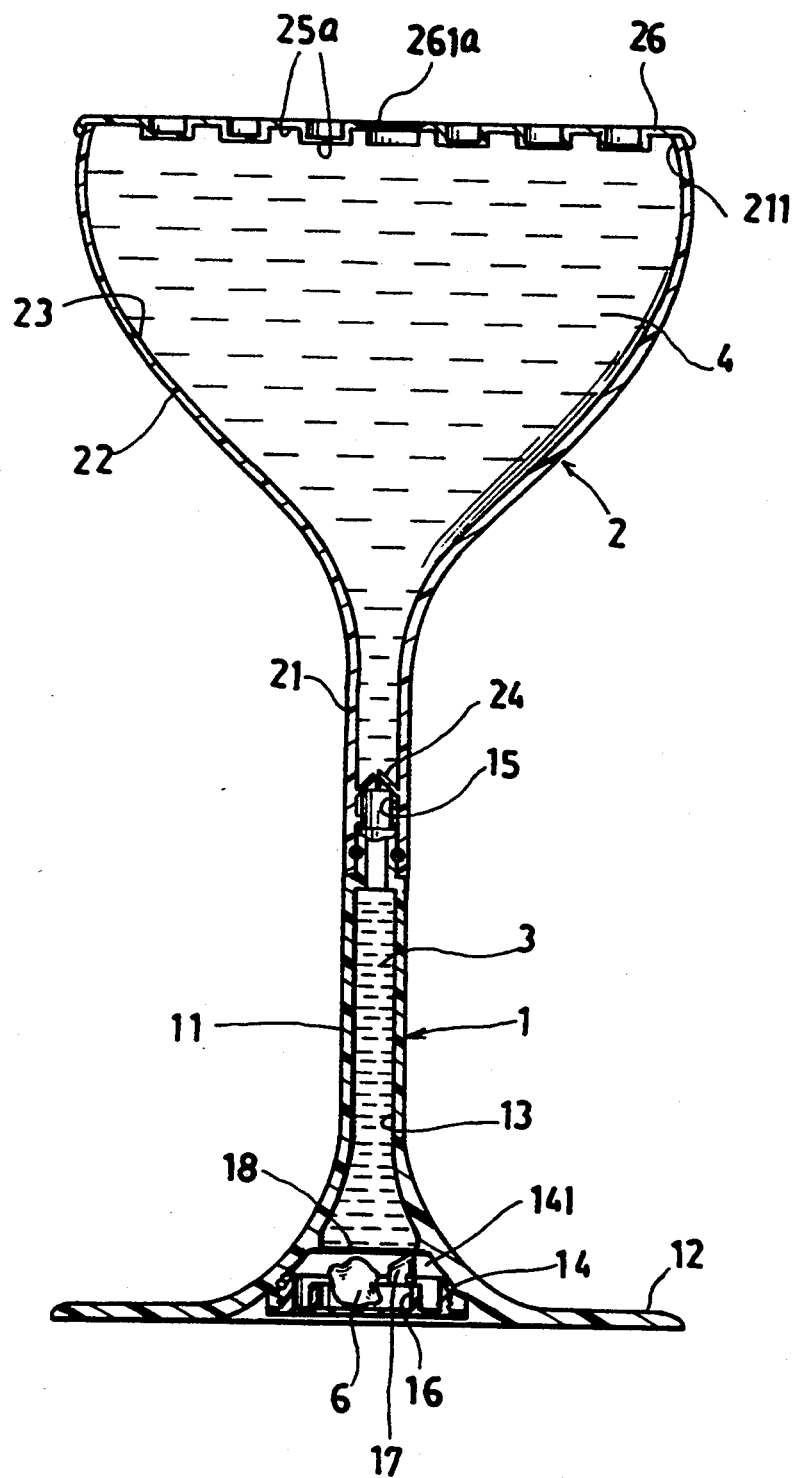
FIG. 9 is a sectional drawing of the stemware when assembled form FIG. 8.

The bowl member 2 includes: a shaking disk formed as a screening plate 25 as shown in FIGS. 1, 2 (or 25a as shown in FIG. 9) secured on an upper portion of the bowl portion 22 for helping agitation and mixing of the first and the second products 3, 4 when engaging and breaking the lower and upper engaging members 15, 24, and a top cover 26 sealing a top opening 221 of the bowl member 2, of which the top cover 26 may be drilled or preformed with a central opening 261 or rupture disk to be inserted therethrough a straw 5 for drinking use as shown in FIG. 7.

The shaking disk of the screening plate 25 as shown in FIGS. 1, 2 includes: a plurality of perforations 251 drilled through the screening plate 25, a pair of pivots 252 disposed on two opposite side portions of the screen plate 25 to be pivotally held on a pair of brackets 253 formed on an upper portion inside the bowl portion 22, whereby upon a shaking of the bowl member 2 to bias the shaking disk 25 to agitate the first and second product 3, 4 flowing through the perforations 251 for helping a homogeneous mixing of the two products 3, 4.

As shown in FIG. 9, the shaking disk 25a is formed as a corrugated surface protruding downwardly from a bottom of a top cover 26 sealing a top opening 221 of the bowl portion 22, with the corrugated surface of the shaking disk 25a helping agitation of the first and second liquids 3, 4 in the blow and stem members 24, 15. For drinking purpose, a rupture disk 261a may be formed on a central position of the top cover 26 to be broken by a straw (not shown) inserted into the bowl portion 22 through an opening of the rupture disk 261a.

As shown in FIG. 9, the stem member 1 further includes: a bottom chamber 141 defined between the bottom cover 14 detachably secured and screwed in a bottom portion of the stem member 1 and a partition membrane 18 sealing a lower portion of the lower chamber 13 filled with the first product 3 in the lower chamber 13, a third product 6 held in a shallow cylinder 16 formed inside the bottom cover 14 within the bottom chamber 141, and a cutting blade 17 protruding upwardly from the bottom cover 14, whereby upon an upwardly moving of the blade 17 to break the membrane 18, the third product may be further mixed with the first and second products 3, 4 in the stem and bowl members 1, 2.

The third product 6 may be selected from: an edible dry ice, a bubbling agent for producing interesting bubbles, or other favorite ingredients soluble in the two products 3, 4 but not limited in this invention.

The present invention is superior to the prior art such as taught by U.S. Pat. No. 3,920,120 because of an instantly mixing of the several products in the vessel can be achieved simultaneously with the assembling of the bowl member 2 on the stem member 1.

I claim:

1. A beverage vessel kit comprising: a stem member (1) including: a hollow stem portion (11) protruding and tapered upwardly from a foot portion (12), a lower chamber (13) defined in said hollow stem portion (11) filled with a first product (3) therein, a bottom cover (14) detachably secured to a bottom of the stem member (1) for sealing a bottom portion of the lower chamber (13), and a lower engaging member (15) formed on a top end portion of the stem member (1) sealing a top end portion of the lower chamber (13); and a blow member (2) attached to said stem member (1) and including: a neck portion 21 tapered downwardly from a bowl portion (22) having an upper chamber (23) filled with a second product (4) therein, and an upper engaging member (24) formed in a lower portion in the neck portion (21) for sealing a bottom of the upper chamber (23) and engaged with the lower engaging member (15) of the stem member (1), tp assemble the bowl member (2) on the stem member (1), said upper engaging member (24) of said bowl member (2) and the lower engaging member (15) of said stem member (1) adapted to be simultaneously broken after they engage each other to thereby mix the second product (4) and the first product (3) with each other.

2. A beverage vessel kit according to claim 1, wherein said lower engaging member (15) includes: a conical plug portion (151) tapered upwardly from a top end of the stem portion (11) and having a thin thickness on the conical plug portion (151), a plurality of lower rigid ridge ribs (152) radially formed on the conical plug portion (151), a protrusion (153) formed on a circumference of a first upper portion of the stem portion (12), and an annular ring (154) annularly formed on a second upper portion of the stem portion (12); and the upper engaging member (24) including: a conical socket (241) conically recessed upwardly from a lower end portion inside the neck portion (21) of the bowl member (2) and engaged with the conical plug portion (151) and having a thin thickness on the conical socket (241) adapted to be operatively ruptured by the lower ridge ribs (152) after the upper and the lower engaging members (24, 15) engage each other, a plurality of upper rigid ridge ribs (242) radially formed in the conical socket (2241) adapted to operatively break the conical plug portion (151) of the lower engaging member (15) after the upper and the lower engaging members (24, 15) engage each other, an annular extension (243) annularly formed on a first lower end portion in the neck portion (21) of the bowl member (2) and having a notch (244) notched in the annular extension (243) and engageable with the protrusion (153) on the stem portion (11) of the stem member (1) for mutually matching, positioning and engaging the upper and lower engaging members (24, 15) for biting the upper ridge ribs (242) with the conical plug portion (151) and biting the lower ridge ribs (152) with the conical socket (241), whereby the plug portion (151) and the conical socket (241) are adapted to rupture simultaneously to mix the first and the second products (3, 4) in the stem member (1) and the bowl member (2), and a ring groove (245) annularly recessed in a second lower portion in the neck portion (21) adapted to engage the annular ring (154) to stably engage the bowl member (2) on the stem member (1).

3. A beverage vessel kit according to claim 1, wherein said bowl member (2) includes: a shaking disk made as a screening plate (25), (25a) secured on an upper portion of the bowl portion (22) adapted to help agitation and mixing of the first and the second products (3, 4).

4. A beverage vessel kit according to claim 3, wherein said shaking disk of the screening plate (25) includes: a plurality of perforations (251) drilled through the screening plate (25), a pair of pivots (252) disposed on two opposite side portions of the screen plate (25), said screen plate pivotally held on a pair of brackets (253) formed on an upper portion inside the bowl portion (22), whereby said shaking disk is adapted to help homogeneous mixing of the two products (3, 4).

5. A beverage vessel kit according to claim 3, wherein said shaking disk (25a) is formed as a corrugated surface protruding downwardly from a bottom of a top cover (26) sealing a top opening (211) of the bowl portion (22), with the corrugated surface of the shaking disk (25a) adapted to help an agitation of the first and second products in the bowl and stem members.

6. A beverage vessel kit according to claim 2, wherein said stem member (1) includes: a bottom chamber (141) defined between the bottom cover (14) detachably secured and screwed in a bottom portion of the stem member (1) and a partition membrane (18) sealing a lower portion of the lower chamber (13) filled with the first product (3) in the lower chamber (13), a third product (6) held in a shallow cylinder (16) formed inside the bottom cover (14) within the bottom chamber (141), and a cutting blade (17) protruding upwardly from the bottom cover (14), whereby the blade (17) is adapted to move upwardly to break the membrane (18) and the third product is adapted to be mixed with the first and second products (3, 4) in the stem and bowl members (1, 2).

* * * * *